United States Patent [19]
Kamel

[11] Patent Number: 6,009,150
[45] Date of Patent: Dec. 28, 1999

[54] CALL PROCESSING METHOD FOR DELIVERING PROMOTIONAL MESSAGES

[75] Inventor: Alexandre P. Kamel, Annapolis, Md.

[73] Assignee: BroadPoint Commuications, Inc., Landover, Md.

[21] Appl. No.: 09/192,306

[22] Filed: Nov. 16, 1998

Related U.S. Application Data

[63] Continuation-in-part of application No. 09/015,063, Jan. 28, 1998, Pat. No. 5,937,037
[60] Provisional application No. 60/085,525, May 14, 1998.

[51] Int. Cl.⁶ .................................................. H04M 1/64
[52] U.S. Cl. .................................. 379/88.22; 379/88.23; 379/111
[58] Field of Search ............................... 379/67.1, 88.09, 379/88.16, 88.22, 88.23, 88.24, 111, 114, 201

[56] References Cited

U.S. PATENT DOCUMENTS

| | | |
|---|---|---|
| Re. 34,380 | 9/1993 | Sleevi . |
| 4,510,349 | 4/1985 | Segre-Amar . |
| 4,811,382 | 3/1989 | Sleevi . |
| 4,850,007 | 7/1989 | Marino et al. . |
| 4,943,995 | 7/1990 | Daudelin et al. . |
| 4,996,705 | 2/1991 | Entenmann et al. . |
| 5,150,399 | 9/1992 | Yasuda . |
| 5,163,087 | 11/1992 | Kaplan . |
| 5,187,735 | 2/1993 | Garcia et al. . |
| 5,222,120 | 6/1993 | McLeod et al. . |
| 5,333,186 | 7/1994 | Gupta . |
| 5,355,403 | 10/1994 | Richardson, Jr. et al. . |
| 5,357,564 | 10/1994 | Gupta et al. . |
| 5,438,615 | 8/1995 | Moen . |
| 5,448,625 | 9/1995 | Lederman . |
| 5,452,350 | 9/1995 | Reynolds et al. . |
| 5,473,681 | 12/1995 | Partridge, III . |
| 5,513,254 | 4/1996 | Markowitz . |
| 5,515,424 | 5/1996 | Kenney . |
| 5,524,142 | 6/1996 | Lewis et al. . |
| 5,539,809 | 7/1996 | Mayer et al. . |
| 5,572,583 | 11/1996 | Wheeler, Jr. et al. . |
| 5,583,918 | 12/1996 | Nakagawa . |
| 5,583,920 | 12/1996 | Wheeler, Jr. . |
| 5,615,251 | 3/1997 | Hogan et al. . |
| 5,623,536 | 4/1997 | Solomon et al. . |
| 5,652,784 | 7/1997 | Blen et al. . |

FOREIGN PATENT DOCUMENTS

| | | |
|---|---|---|
| 57-87661 | 6/1982 | Japan . |
| 58-173951 | 10/1983 | Japan . |

OTHER PUBLICATIONS

Gerry Blackwell, "Dial–a–Quote: first Canadian commercial audiotex service", Computing Canada, pp. 21–22, Oct. 3, 1985.

Alan Field, "The Yellow Page Operator", Forbes, Jul. 15, 1985, pp. 106–107.

Paul D. Thomas, "Don't Hang Up", Venture Strategies, Apr. 1986, p. 100.

Steve Blount et al., "Talking Yellow Pages", Target Marketing, Oct. 1987, pp. 40–41.

Patricia Stroad et al., "Yellow Pages that 'talk' have major hangups" Advertising Age, v. 61, No. 42, Oct. 8, 1990, p.73.

*Primary Examiner*—Scott Weaver
*Attorney, Agent, or Firm*—Jones Volentine, LLP

[57] ABSTRACT

An interactive voice response and call process application and system for delivering promotional messages allows a user to select a desired number of promotional messages which are played before a connection is established. The user may also request additional promotional messages at any time during the connection in order to extend a free or subsidized connection period provided by the system. The system monitors the connection and provides a warning tone to the user prior to the end of the free or subsidized calling period. The user may then request an additional promotional message, to extend the time period, or terminate the connection in an orderly fashion.

8 Claims, 6 Drawing Sheets

CALL PROCESSING METHOD FOR DELIVERING PROMOTIONAL MESSAGES

CROSS-REFERENCE TO RELATED APPLICATIONS

This application is a Continuation-In-Part of U.S. application Ser. No. 09/015,063, filed Jan. 28, 1998, entitled "Telephony System for Delivering Promotional Messages," the entirety of which is hereby incorporated by reference as if fully set forth herein now U.S. Pat. No. 5,937,037. This application also claims the benefit of priority of U.S. provisional application No. 60/085,525, filed May 14, 1998.

BACKGROUND OF THE INVENTION

1) Field of the Invention

This invention pertains to the field of telephony and more particularly to a system and method for providing promotional messages to end-user telephony subscribers.

2) Description of the Related Art

Telephony systems have been proposed which allow subscribers to place telephone calls for free or at reduced rates in exchange for exposing the subscriber to advertiser-sponsored promotional messages. Generally, prior art systems of this type fall into one of two categories: (a) systems which incorporate message front-loading; and (b) systems which incorporate mid-call message cycling.

Message front loading systems allow a caller to hear a fixed amount of advertising before an outbound call is connected in exchange for a fixed amount of free or subsidized communication time. In such a system, a caller dials in to the telephony system and hears a predetermined amount of advertising or other sponsored or promotional messaging. After the message period has ended, the caller is connected to the call destination for a predetermined period of time during which the caller may talk with a called party. At the end of the predetermined period of time, the connection is terminated or may continue subject to fees (i.e., it is no longer free or subsidized).

Such message front loading systems suffer several disadvantages. There is provided no flexibility for a caller to earn a period of time for free or subsidized calling which closely matches the desired length of the call. Callers do not have the option to hear a brief amount of advertising in exchange for a brief period of free or subsidized time, or conversely, to hear an extended amount of advertising in exchange for an extended period of free or subsidized time.

If a caller only desires to place a brief call, they must still wait through a long advertisement or fixed series of advertisements before the call is connected. As the messages are played before the call is connected, the caller may lose a substantial amount of time which was invested in the advertisement(s) if the called party does not answer or is busy. Conversely, if a caller desires to place a call requiring a longer time period than that allowed in exchange for hearing the message(s), the system does not provide flexibility to allow the caller to earn a longer time allotment if they so desire by hearing additional advertising. The call is automatically disconnected, or reverts to a per-minute or other rate basis, at the end of the time period provided by the system based on the promotional message(s) played before the call.

Also, such a system does not provide flexibility to allow callers to extend their free or subsidized time allotment during the call, if necessary or desired to extend their conversation without being disconnected or without reverting to a per minute or other rate-based service.

Meanwhile, mid-call message cycling systems allow a caller to hear commercial messages at regular intervals throughout the duration of their call, earning a period of time for free or subsidized calling for each message heard. With such systems, a caller accesses the service, hears a single, brief message and then is connected for a predetermined, and typically brief (e.g., two minutes) time allotment of free or subsidized calling. Upon expiration of the time allotment, another message is interjected into the conversation, allowing the caller to earn an additional allotment of time for free or subsidized calling, and the process repeats.

However, such mid-call cycling systems also suffer considerable limitations. First, a caller is unable to earn an extended time allotment for uninterrupted free or subsidized calling before the call is placed because they cannot control the number of messages heard before the call is placed, and therefore they cannot control the duration of the period of free or subsidized calling earned. This introduces significant limitations with respect to the type of calls which can be placed via the service. For example, a caller cannot communicate for an extended period of time without revealing the fact that they are using a sponsored communication service. This may be a significant limitation for a caller who desires to use the service to call businesses or professional colleagues or other parties to whom they may not desire revealing that they are using a sponsored calling service, or otherwise to not want to be subject to periodic interruptions.

Second, because callers do not have an option to earn an extended time allotment for free or subsidized calling by listening to multiple messages either at the beginning or during the call, callers must endure relatively frequent interruptions throughout the call at relatively short intervals. This is particularly inconvenient since callers cannot control the timing of message interjections and consequently messages may be played at awkward or otherwise inconvenient times during the call.

Also, because callers do not have an option to control the amount of time initially earned for free or subsidized calling by listening to as many messages as they may choose to hear at the beginning of the call, such services are not useful for transmitting facsimiles, checking voicemails, or accessing the Internet since interjected messages would interfere with the communication.

In consideration of the above-noted drawbacks of the related art, it would be advantageous to provide a method and system which allows a user to select a number of promotional messages which are played to earn a desired period of time for free or subsidized calling. Thus, a user may earn time allotment which closely matches the desired length of the call.

It would also be advantageous to provide a system and method which allows a user to request that additional promotional messages be played at the user's convenience during a connection to earn additional free or subsidized connection time. Thus, a user may extend their connection time as long as they desire by earning additional free or subsidized time by listening to any number of messages played at any time during a call at the user's request.

It would also be advantageous to provide a system and method which provides a warning tone to a user informing them that their free or subsidized connection time is about to expire. Thus, a user may end their connection in an orderly fashion, or, if desired, request additional promotional messages to earn additional free or subsidized connection time.

Other and further objects and advantages will appear hereinafter.

SUMMARY OF THE INVENTION

The present invention comprises an interactive voice response and call process application and system for delivering promotional messages.

In one aspect of the invention, a telephony network service provider system plays a user-selected number of promotional messages prior to connecting the user with a destination number. The user earns a period of time for free or subsidized calling according to the number and type of messages which are played. Thus, a user may earn a time allotment which closely matches the desired length of their call.

In another aspect of the invention, a telephony network service provider system allows a user to request additional promotional messages during a connection to earn additional free or subsidized connection time. Thus, a user may extend their connection time as long as they desire by earning additional free or subsidized time.

In yet another aspect of the invention, a telephony network service provider system provides a warning tone to a user informing them that their free or subsidized connection time is about to expire. Thus, a user may end their connection in an orderly fashion, or, if desired, request additional promotional messages to earn additional free or subsidized connection time.

DESCRIPTION OF THE PREFERRED EMBODIMENTS

Figure 1:
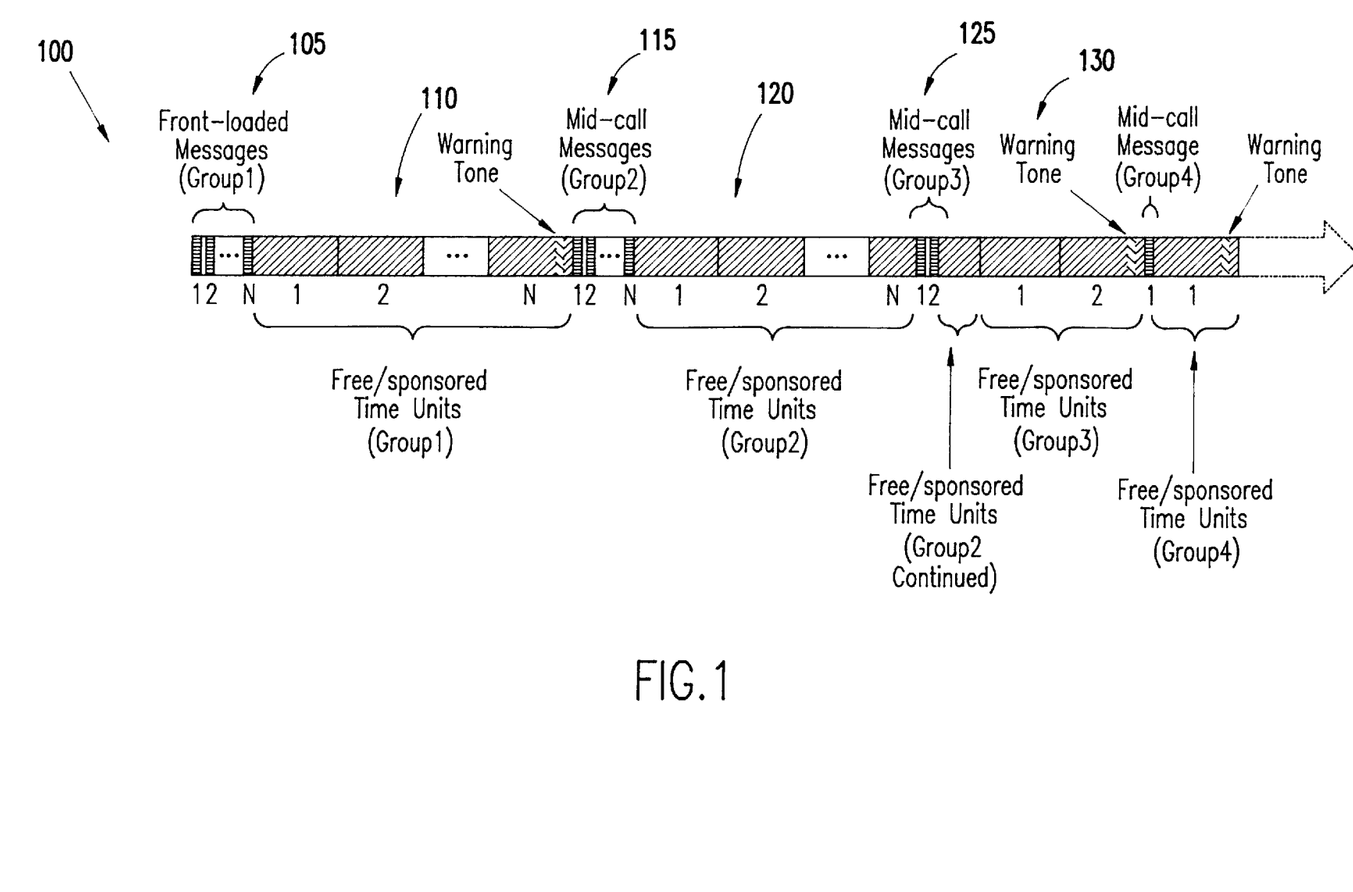
FIG. 1 is illustrates a call connection process for a telephony user of a system according to one or more aspects of the present invention.

FIG. 1 illustrates a high level view of a call connection process 100 for delivering promotional messages to a telephony user in exchange for free or subsidized connection time. The process illustrates various aspects of the present invention.

During an initial time period 105 of the illustrated process 100, a system plays one or more front-loaded promotional messages to a user before their call is connected. During this initial time period 105, the user earns an allotment of time for free or subsidized connection, depending upon the number and/or type of promotional messages which are played. The user is allowed to select the number of messages which are played during the initial time period 105. This allows the user to earn a desired amount of free or subsidized connection time before initiating a call.

During a second time period 110, the user's call is connected with a dialed party for a period of uninterrupted connection. The time length of the connection is determined by the amount of time earned during the initial time period 105. A warning tone is played to the user a short time period prior to expiration of the earned time period for free or subsidized calling.

In the illustrative process of FIG. 1, the user wishes to continue the connection beyond the initial earned time allotment period. Thus, during a third time period 115, the system plays mid-call promotional messages to the user. As before, the user is allowed to select the number of messages which are played during the third time period 115. This allows the user to earn a desired amount of free or subsidized connection time for continuing the call.

During a fourth time period 120, the user's connection with the dialed party continues for a period which is determined by the amount of time earned during the third time period 115.

In the illustrative process of FIG. 1, the user wishes to hear additional promotional messages prior to expiration of the earned time allotment. Thus, during a fifth time period 125, the system plays mid-call promotional messages to the user. As before, the user is allowed to select the number of messages which are played during the fifth time period 125.

During a sixth time period 130, the user's connection with the dialed party continues for a period which equals the remaining amount of time earned during the first, third, and fifth time periods. This process continues until the user terminates the connection, or until the user's earned time allotment expires without the user electing to have further promotional messages played. In that case, the user will be billed for minutes of use beyond the earned time allotment. Alternatively, the connection may be terminated when the earned time allotment expires.

FIGS. 2A–2D show a preferred embodiment of a flowchart for a method of delivering promotional messages to a telephony user according to one or more aspects of the present invention.

Figure 2A:
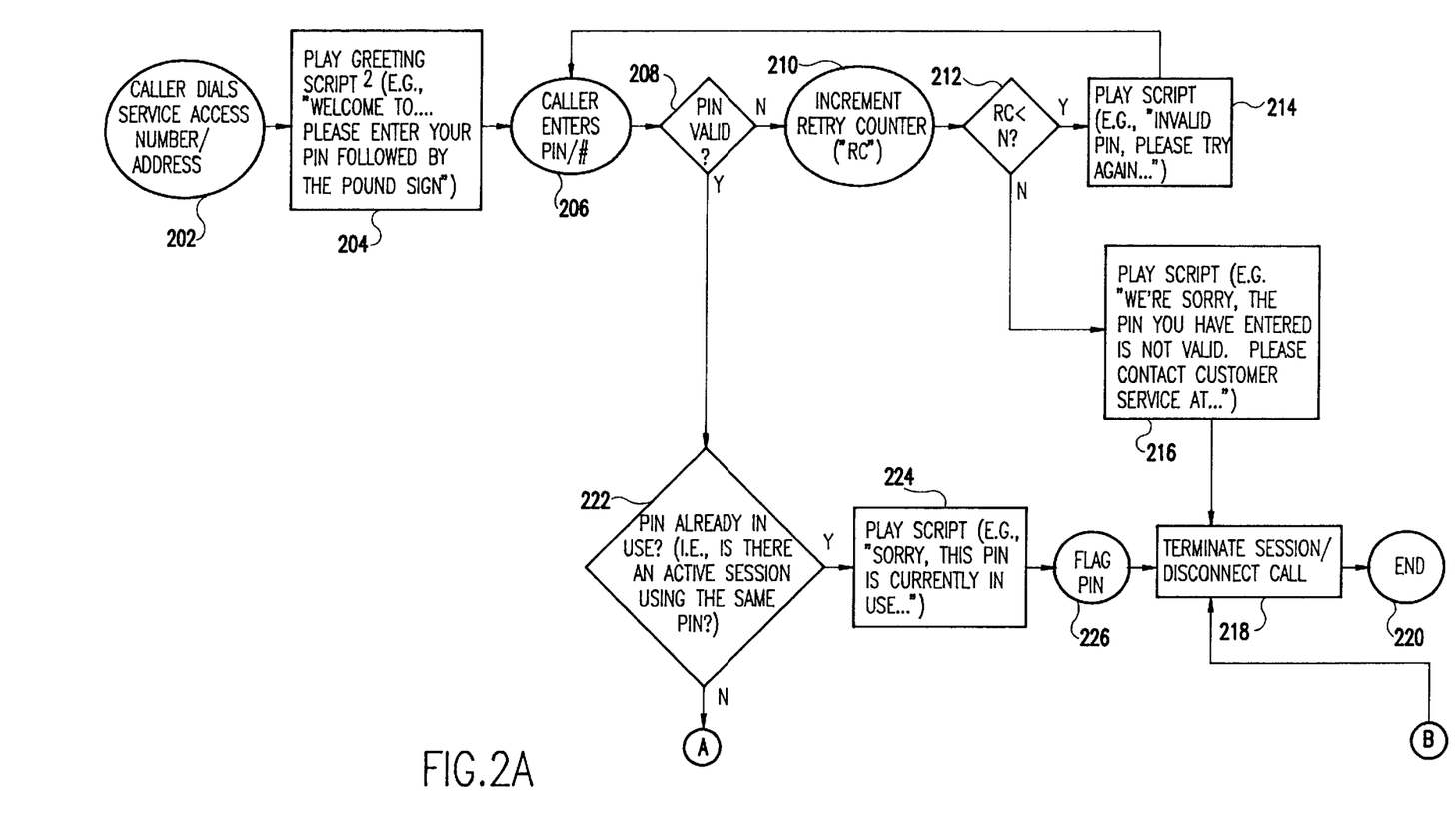
FIGS. 2A–2D show an exemplary flowchart of an interactive voice response and call process method of delivering promotional messages via a telephony system according to one or more aspects of the present invention.

In a first step 202, a caller dials a service access number or address to connect to a telephony network service provider system. The service access number may be a toll free number (e.g., 800, , 877, or 888 area code). A connection is thus established between the telephony user and the system.

In a step 204, the system plays a greeting script. The greeting script may be an audio message, or may be audio-visual or graphical depending upon the media. The script shown in FIG. 2A is illustrative, and other scripts may be used, or the script may be eliminated entirely if appropriate.

In a preferred embodiment, the telephony user accesses the system by means of a personal identification number (PIN). The PIN is used to identify an individual user's identity to control access to the system. In practice, the PIN may be a numeric or alphanumeric code. The code may be entered via a keypad, a keyboard, a magnetic strip, a voice command from the user in conjunction with a voice recognition system, or by other suitable means for identification and verification. In a preferred embodiment, the telephony user is prompted during the greeting to enter a PIN to access the system.

In the case of PIN access to the service, in a step 206 the telephony user enters the PIN. The user may confirm the PIN by following with a confirmation, such as a # on a keypad, an "enter" key on a keyboard, a mouse-click, etc. as appropriate depending upon the media.

In a step 208 the system checks to see if the PIN is valid.

If the PIN is determined to be invalid, in a step 210 the system increments a PIN RETRY counter. In a step 212, the system checks the PIN RETRY count in the PIN RETRY counter against a PIN ENTRY ATTEMPT LIMIT "N."

If the PIN RETRY count is less than the PIN ENTRY ATTEMPT LIMIT "N," then in a step 214, the system plays a script prompting the user to reenter the PIN. The script shown in FIG. 2A is illustrative, and other scripts may be used. Then the process returns to step 206 wherein the user enters the PIN and the process repeats itself.

On the other hand, if the PIN RETRY count equals the PIN ENTRY ATTEMPT LIMIT "N," then in a step 216 the system plays a script informing the user that they have entered an invalid PIN. The script may also inform the user that they should contact customer service and/or that they are being disconnected. The script shown in FIG. 2A is illustrative, and other scripts may be used. In a step 218, the system disconnects the user and terminates the session. The process ends in a step 220.

In a preferred embodiment, the system is designed to restrict simultaneous use of the same PIN by multiple users. This allows the system to uniquely identify each individual user. This in turn increases the probability that sponsored promotional messages are reaching their intending audiences.

Thus, if the PIN entered in the step 206 is determined to be valid in the step 208, then the system checks in a step 222 whether or not the PIN is currently in use by another user.

If it is determined in the step 222 that the PIN which was entered is already currently being used by another user, then in a step 224 the system plays a script informing the user that the PIN they have entered is currently in use. The script may also inform the user that they should contact customer service and/or that they are being disconnected. The script shown in FIG. 2A is illustrative, and other scripts may be used.

For example, it should be understood that other features may be available to a user of a telephony system incorporating the present invention. One or more of those features may be accessed by the user after PIN number entry. For example, the system may offer an "audio e-mail access feature" wherein a user can receive audio e-mail messages on a free or subsidized basis in exchange for listening to promotional messages. In that case, a user's e-mail messages may be applied to a voice synthesizer and relayed to the user using a system such as that disclosed herein.

Turning again to the exemplary embodiment of FIG. 2A, following the step 224, the system flags the PIN in a step 226. This allows the system to identify PINs which may have been compromised and are potentially being used fraudulently. After flagging the PIN, in the step 218 the system disconnects the user and terminates the session. The process ends in the step 220.

If it is determined in the step 222 that the PIN which was entered is not currently being used by another user, then in a step 228 the system plays a script prompting the user to enter a destination telephone number with which the user desires to be connected. The script shown in FIG. 2A is illustrative, and other scripts may be used.

In a step 230 the telephony user enters the destination telephone number they wish to be connected with. The user may confirm the destination telephone number by following with a confirmation, such as a # on a keypad, an "enter" key on a keyboard, a mouse-click, etc. as appropriate depending upon the media.

Figure 2B:
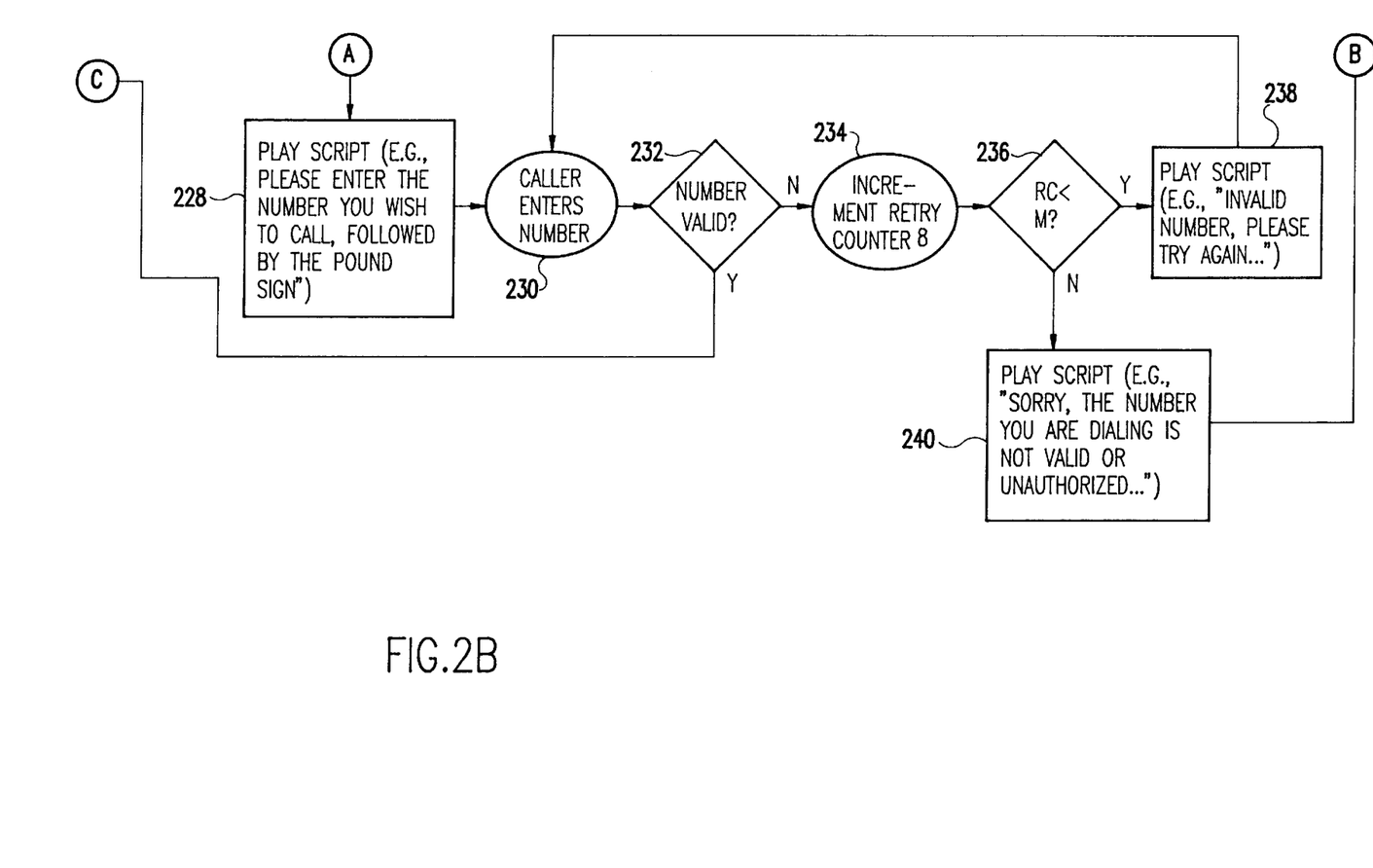

In a step 232 the system checks to see if the destination telephone number is valid. In this way, the system may prevent access to unauthorized destinations. For example, the system may prohibit telephony calls to international numbers or pay-per-call (e.g., 900 area code) numbers.

If the destination telephone number is determined to be invalid, then in a step 234 the system increments a DESTI-NATION TELEPHONE NUMBER RETRY counter. In a step 236, the system checks the DESTINATION TELE-PHONE NUMBER RETRY count in the DESTINATION TELEPHONE NUMBER RETRY counter against a DESTINATION TELEPHONE NUMBER ENTRY ATTEMPT LIMIT "M."

If the DESTINATION TELEPHONE NUMBER RETRY count is less than the DESTINATION TELEPHONE NUMBER ENTRY ATTEMPT LIMIT "M," then in a step 238, the system plays a script prompting the user to reenter the destination telephone number. Then the process returns to step 230 wherein the user enters the destination telephone number and the process repeats itself.

On the other hand, if the DESTINATION TELEPHONE NUMBER RETRY count equals the DESTINATION TELE-PHONE NUMBER ENTRY ATTEMPT LIMIT "M," then in a step 240 the system plays a script informing the user that they have entered an invalid destination telephone number. The script may also inform the user that they should contact customer service and/or that they are being disconnected. In the step 218, the system disconnects the user and terminates the session. The process ends in the step 220.

If the destination telephone number entered in the step 230 is determined to be valid in the step 232, then in a step 242 the system plays a sponsored promotional message for the telephony user. The promotional message may be in audio, graphical, audiovisual, or multimedia format depending upon the media.

Upon completion of the promotional message, in a step 244 the system increments a message count in a message counter. Based upon the message count in the message counter, the system may provide free or subsidized time allotment for the telephony user to be connected to the destination number. Thus in the step 244, the system also adds a time unit to an earned time allotment for free or subsidized calling.

Figure 2C:
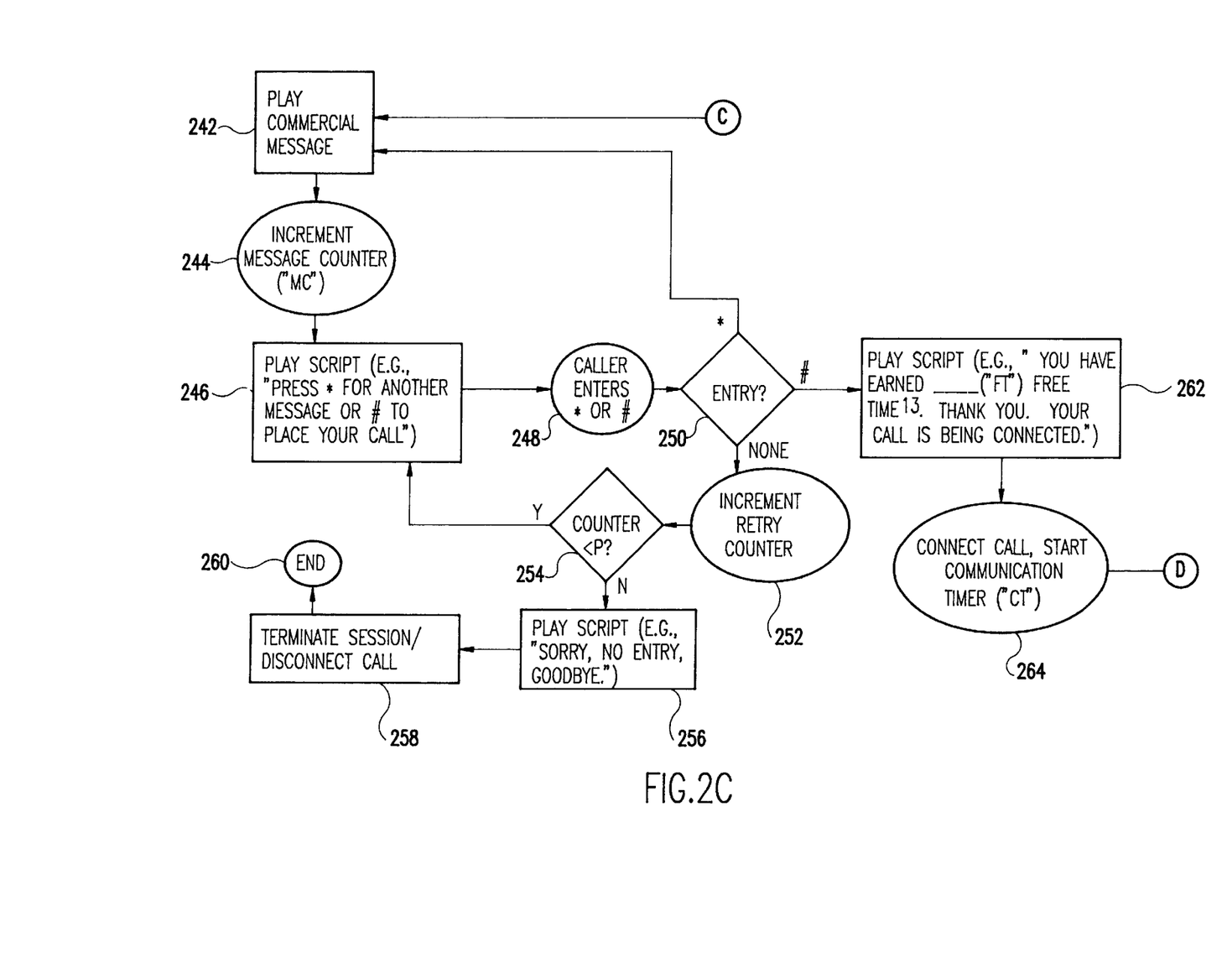

Next, in a step 246, the system plays a script prompting the user to choose between (i) receiving another promotional message to add additional time to the earned time allotment, or (ii) commencing connection with the destination telephone number. By selecting option (i), the telephony user may earn additional free or subsidized time prior to initiating the connection. In this way, the system provides flexibility for the telephony user to earn an allotment of time for free or subsidized calling which closely matches the desired length of the call.

The prompt instructs the telephony user to enter a first telephony code for another promotional message, or to enter a second telephony code to initiate the call to the destination telephone number. For example, the first telephony code may be a * key and the second telephony code may be a # key. The script shown in FIG. 2C is illustrative, and other scripts may be used.

In a step 248, the telephony user enters a telephony code.

In a step 250, the system checks to see what telephony code was entered. If the telephony code is neither the first telephony code nor the second telephony code, then the telephony code is invalid.

If the telephony code is determined to be invalid, in a step 252 the system increments a TELEPHONY CODE RETRY counter. In a step 254, the system checks the TELEPHONY CODE RETRY count in the TELEPHONY CODE RETRY counter against a TELEPHONY CODE ENTRY ATTEMPT LIMIT "P."

If the TELEPHONY CODE RETRY count is less than the TELEPHONY CODE ENTRY ATTEMPT LIMIT "P," then the process returns to step 246 wherein the user enters the telephony code and the process repeats itself.

On the other hand, if the TELEPHONY CODE RETRY count equals the TELEPHONY CODE ENTRY ATTEMPT LIMIT "P," then in a step 256 the system plays a script informing the user that they have not entered a valid choice. The script may also inform the user that they are being disconnected. The script shown in FIG. 2C is illustrative, and other scripts may be used. In the step 258, the system disconnects the user and terminates the session. The process ends in the step 260.

If the system determines in the step 250, that the user entered the first telephony code, requesting another promotional message, then the process returns to step 242 wherein the system plays an additional sponsored promotional message for the telephony user and the process repeats itself.

If the system determines in the step 250, that the user entered the second telephony code to initiate the call to the destination telephone number, then in a step 262 the system plays a script informing the telephony user as to the time allotment for free or subsidized calls which has been earned. The script may also inform the user that their call is now being connected. The script shown in FIG. 2C is illustrative, and other scripts may be used.

Next, in a step 264, the system connects the telephony user with the destination telephone number and starts a communication timer to track the connection time.

Figure 2D:
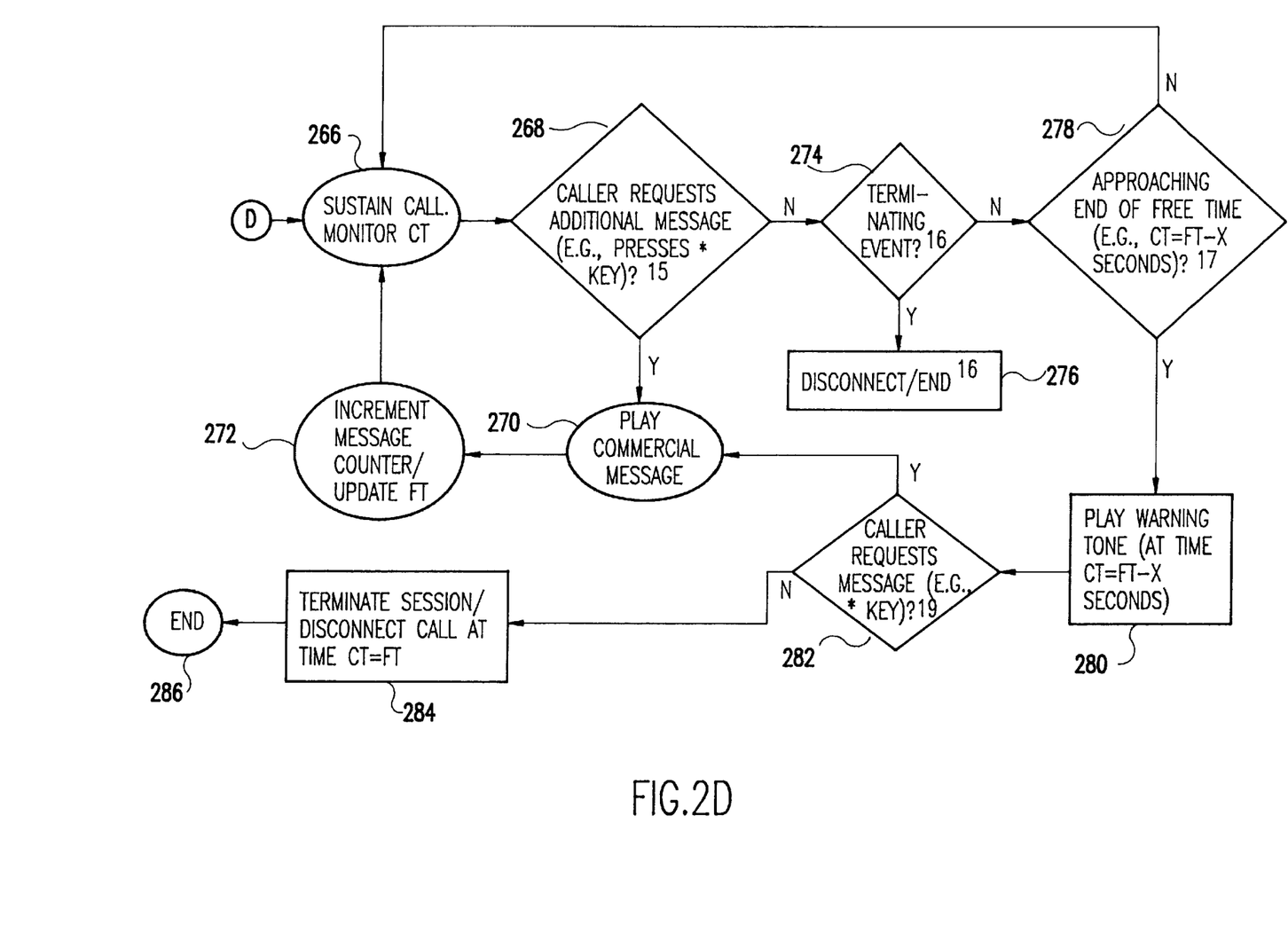

In a step 266, the system monitors the connection time in the communication timer. The connection time is subtracted form the earned time allotment to produce a remaining earned time allotment. So long as the remaining earned time allotment is greater than zero, the system maintains the connection.

In a step 268, the system monitors whether the telephony user requests an additional promotional message to increase the remaining earned time allotment for free or subsidized calling. At any time during the connection, the user may increase their time allotment by entering a designated telephony code. In a preferred embodiment, the designated telephony code is the first telephony code as described earlier with respect to the step 248. For example, the designated telephony code may be a * key.

If the system determines that the telephony user has entered the designated telephony code, then in a step 270 the system plays an additional sponsored promotional message for the telephony user.

Upon completion of the promotional message, in a step 272 the system increments the message count in the message counter. The system also adds a time unit to an earned time allotment for free or subsidized calling. Meanwhile, the system continues to maintain the telephony connection and monitors the connection time in the communication timer.

If the system determines that the telephony user has not entered the designated telephony code, then in a step 274 the system monitors whether a terminating event has occurred. For example, the telephony user may have terminated their call.

If the system determines that a terminating event has occurred, then in a step 276 the system terminates the connection and the process ends.

If the system determines that a terminating event has not occurred, then in a step 278 the system determines whether the earned time allotment for free or subsidized calling is nearing its end. In a preferred embodiment, the system monitors the remaining earned time allotment to determine when the remaining earned time allotment is less than a predetermined time threshold X.

If the system determines that the remaining earned time allotment exceeds the predetermined time threshold, then the system returns to step 266 where it continues to maintain the connection and continues to monitor the connection time in the communication timer.

If the system determines that the remaining time allotment is less than the predetermined time threshold, then in a step 288, the system plays a warning tone to the telephony user. This informs the telephony user that their earned time allotment for free or subsidized calling is about to expire.

In a preferred embodiment, the warning tone is inaudible to the called party.

In a step 282, the system monitors whether the telephony user requests an additional promotional message to increase the time allotment for free or subsidized calling before the call is terminated. This allows the user an opportunity to extend the call upon hearing the warning tone by entering the designated telephony code.

If the system determines that the telephony user has entered the designated telephony code, then in the step 284 the system plays an additional sponsored promotional message for the telephony user as described before, and the process repeats.

If the system determines that the telephony user has not entered the designated telephony code, then upon the system waits until the remaining earned time allotment is zero. At that point, in the step 270 the system disconnects the telephony user and terminates the call. The process ends in a step 286.

In an alternative embodiment, when the remaining earned time allotment expires, the connection is not terminated. In that case, the user will be billed for minutes of use beyond the earned time allotment.

Figure 3:
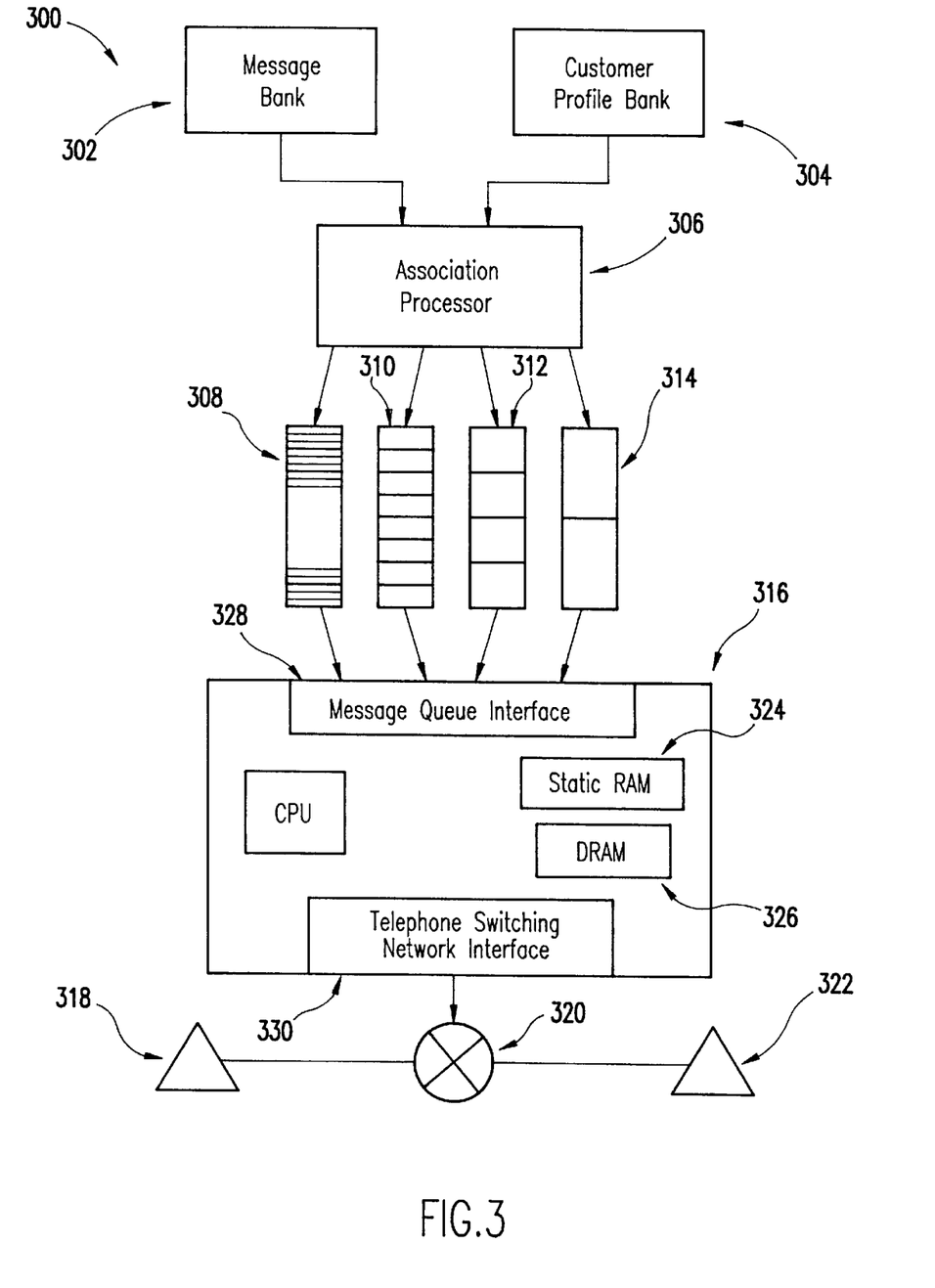
FIG. 3 shows a top level configuration of a preferred embodiment of an interactive voice response and call process system for delivering promotional messages via a telephony system according to one or more aspects of the present invention.

FIG. 3 shows a top level configuration of an interactive voice response and call process system 300 for delivering promotional messages via a telephony system according to one or more aspects of the present invention.

A message bank 302 contains promotional messages to be delivered to subscribed calling parties and/or called parties.

In a preferred embodiment, each user is assigned and identified by a unique personal identification number (PIN), which is stored in a customer profile bank 304.

Reference numeral 306 denotes an association processor which associates a message contained in the message bank 302 with one or more customer PINs by matching targeting parameters with corresponding profile data contained in the customer profile bank 304. In this way, promotional messages may be targeted at specific, individual users, In a preferred embodiment, the associations between customers and messages are stored in one or more message queues 308, 310, 312 and 314. Multiple message queues may be used, for example, to provide several different levels of targeting for the promotional messages. In a preferred embodiment, queue 308 is an individual queue, queue 310 is a category queue, queue 312 is a geographic queue, and queue 314 is a general queue. For example, the system may include one individual queue 310 corresponding to each PIN for each subscriber to the system.

In a preferred embodiment, each queue is identified by a unique queue identification number (QIN). A message queue may also include a QIN reference or pointer to another message queue. In this way, an individual queue 308 may link to one or more category queues 310 and/or geographic queues 312.

Reference numeral 316 denotes a call processor which retrieves the messages designated in the message queues 308 through 314 for delivery to the calling party 318 and/or the called party 322 via a telephone switching network 320. It is noted that the call processor 316 and the association processor 306 can be implemented by physical distinct processors, or by a single processor having multitasking functions.

The call processor 316 may include static memory 324, dynamic memory 326, message queue interface(s) 328, and a telephone switching network interface 330. The call processor provides messages from the message interface queue(s) to the user via the telephone switching network 320.

In a preferred embodiment, the call processor 316 may execute a call connection program according to a method such as that described with respect to the flowchart 200 in FIG. 2.

In a preferred embodiment, when a subscriber enters their assigned PIN, the call processor 316 immediately checks the corresponding individual queue 308 (retrieves individual message associations) for the next message to be played. If a message or message pointer is contained in the subscriber's individual queue 308, the message is played or reproduced for the subscriber either before or after the subscriber is connected to the called party. If no such message exists (all individually associated messages meeting required criteria have been played), or no such associations have been established, the system toggles to the next queue. In the case where the empty individual queue provides a queue identification number pointing to a relevant catagory queue 310, and a message exists in the category queue 310, the call processor 316 draws and plays the first message designated in the queue. If no such messages exist, or upon depletion thereof, or if no category QIN exists, the system toggles to the geographic queue 312. If a message exists in the geographic queue 312 specified by the PIN of the calling party, (or identified through automatic number identification (ANI), where available) the next message is played. And finally, if no such message exists in the geographic queue 312 of the PIN or ANI, the next message contained in the general queue 314 is played.

Preferably, the search routine is predefined and strictly mechanical to minimize processing at the time of the call. This is enabled by the fact that message associations have been pre-established and associated messages presorted within each queue by way of coding logic described later. This allows the system to simply toggle from queue to queue, retrieving the first (next) message in the queue, without the need for matching messages to subscribers at the time the call is placed.

While preferred embodiments are disclosed herein, many variations are possible which remain within the concept and scope of the invention. For example, although the preferred embodiment is described herein with respect to a delivery system such as that described in co-pending application Ser. No. 09/015,063, filed Jan. 28, 1998, entitled "Telephony System for Delivering Promotional Messages," it is contemplated that other delivery systems may be used. Also, although the preferred embodiment is described wherein user-identification is provided with a PIN, it is understood that other methods are possible and contemplated, including automatic number identification (ANI). Furthermore, the order of certain steps may be changed such as, e.g., the first promotional message may be played before prompting the user to enter a PIN and/or a destination number. Such variations would become clear to one of ordinary skill in the art after inspection of the specification, drawings and claims herein. The invention therefore is not to be restricted except within the spirit and scope of the appended claims.

What is claimed is:

1. A method of delivering promotional messages to a calling party in a telephony system, comprising:

outputting a number of promotional messages to the calling party, wherein the number of promotional messages is selected by the calling party to correspond to a desired time interval for a call connection; and maintaining the call connection between the calling party and a called party for said desired time interval.

2. The method of claim 1, further comprising playing a warning tone to the calling party when a remaining portion of the desired time interval is less than a predetermined time threshold.

3. The method of claim 2, further comprising terminating said call connection when the portion of the desired time interval is zero.

4. A method of delivering promotional messages to a calling party in a telephony system, comprising:

maintaining a telephony connection between the calling party and a called party while a remaining earned time allotment is greater than zero;

subtracting time from said remaining earned time allotment while said telephony connection is maintained;

monitoring said telephony connection to determine if the calling party enters a telephony code indicating a request for an additional promotional message;

in response to detecting said telephony code indicating a request for an additional promotional message, outputting the additional promotional message to the calling party, incrementing a message counter, and adding a time unit to the remaining earned time allotment; and terminating said telephony connection when the remaining earned time allotment is zero.

5. A method of delivering promotional messages to a telephony user, comprising:

(a) receiving a call from the telephony user to a service access number;

(b) prompting the telephony user to enter a destination telephone number;

(c) outputting a promotional message to the telephony user;

(d) adding a time unit to an earned time allotment;

(e) prompting the telephony user to enter a first telephony code for another promotional message or to enter a second telephony code to initiate a connection to the destination telephone number;

(f) repeating steps (c) through (e) in response to the telephony user entering the first telephony code; and (g) initiating the connection to the destination number in response to the telephony user entering the second telephony code.

6. The method of claim 5, further comprising prompting the telephony user to enter a personal identification number after receiving the call from the telephony user.

7. The method of claim 6, further comprising:

receiving the personal identification number from the telephony user;

determining whether the personal identification number is valid; and disconnecting the telephony user if the telephony user fails to enter a valid personal identification number after a predetermined number of attempts.

8. The method of claim 7, further comprising determining whether the personal identification number is in use.

* * * * *